May 23, 1950 J. R. PIERCE 2,508,622

PULSE CODE MODULATION COMMUNICATION SYSTEM

Filed July 9, 1945 8 Sheets-Sheet 1

INVENTOR
J. R. PIERCE
BY William F. Simpson.
ATTORNEY

INVENTOR
J. R. PIERCE
BY William F. Simpson.
ATTORNEY

May 23, 1950 J. R. PIERCE 2,508,622

PULSE CODE MODULATION COMMUNICATION SYSTEM

Filed July 9, 1945 8 Sheets-Sheet 3

INVENTOR
J. R. PIERCE
BY William F. Simpson
ATTORNEY

May 23, 1950 J. R. PIERCE 2,508,622

PULSE CODE MODULATION COMMUNICATION SYSTEM

Filed July 9, 1945 8 Sheets-Sheet 4

INVENTOR
J. R. PIERCE
BY William F. Simpson
ATTORNEY

INVENTOR
J. R. PIERCE
BY William [signature]
ATTORNEY

PULSE CODE MODULATION COMMUNICATION SYSTEM

Filed July 9, 1945 8 Sheets-Sheet 6

INVENTOR
J. R. PIERCE
BY *William F. Simpson*
ATTORNEY

May 23, 1950 J. R. PIERCE 2,508,622

PULSE CODE MODULATION COMMUNICATION SYSTEM

Filed July 9, 1945 8 Sheets-Sheet 7

INVENTOR
J. R. PIERCE
BY William F. Simpson
ATTORNEY

May 23, 1950 J. R. PIERCE 2,508,622

PULSE CODE MODULATION COMMUNICATION SYSTEM

Filed July 9, 1945 8 Sheets-Sheet 8

INVENTOR
J. R. PIERCE
BY William F. Simpson
ATTORNEY

Patented May 23, 1950 2,508,622

UNITED STATES PATENT OFFICE 2,508,622

PULSE CODE MODULATION COMMUNICATION SYSTEM

John R. Pierce, Millburn, N. J., assignor to Bell Telephone Laboratories, Incorporated, New York, N. Y., a corporation of New York Application July 9, 1945, Serial No. 603,989

10 Claims. (Cl. 179—1.5)

Figure 1:
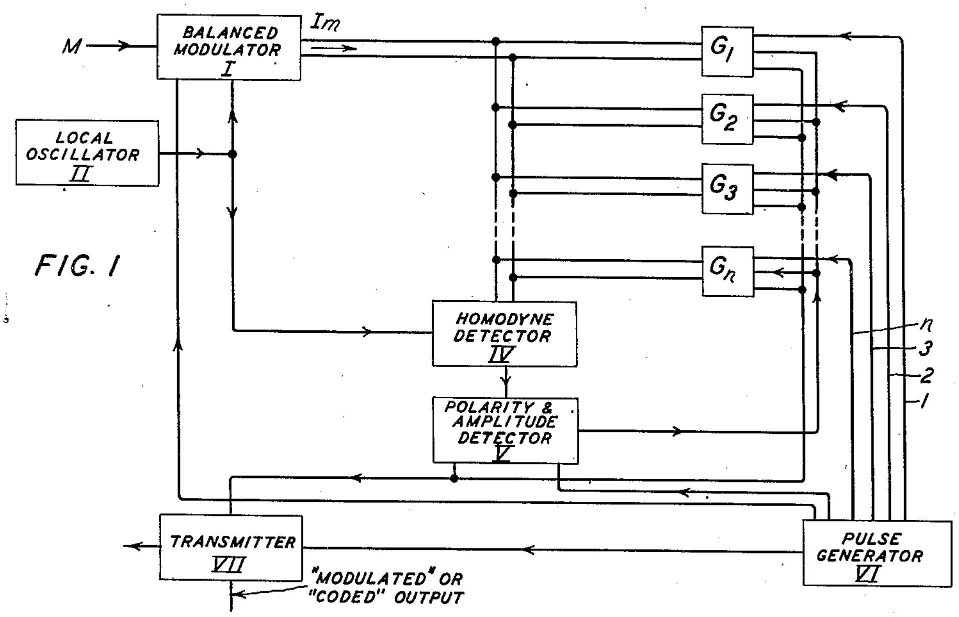

This invention relates to communication systems for the transmission of complex wave forms of the type encountered in speech, music, sound, mechanical vibrations and picture transmission by means of code groups of a uniform number of signal pulses of a plurality of different types or signaling conditions transmitted at high speed.

The object of the present invention is to provide a communication system capable of transmitting and reproducing with high fidelity a complex wave form over an electrical transmission path in such a manner that the signal-to-noise ratio of the received signal is materially improved, the frequency band width required for the transmission of the signals being held at the same time to a minimum.

Another object of this invention is to provide improved and simplified methods and apparatus capable of transmitting and receiving signal impulses over a noisy channel and deriving therefrom signals having a high signal-to-noise ratio.

More specifically, it is an object of the present invention to provide methods of and circuits and apparatus for transmitting in succession a group of pulses in sequence over a given channel representative of the amplitude of a complex wave at successive instants of time.

It is a further object of the present invention to provide improved apparatus for determining the code to be transmitted to represent each of a large number of different amplitudes without the use of complicated counting circuits, arrangements and equipment.

Still another object of the present invention is to transform a series of pulses representing the amplitude of a complex wave at a given instant of time into a single pulse having an amplitude which is a function of the amplitude of the original complex wave at the given instant.

Another object of this invention is to recombine a succession of such single pulses of varying amplitude in a manner to reconstruct a wave form of substantially the same shape as the wave form to be transmitted.

A feature of the invention relates to a sampling apparatus for sampling a complex wave at frequent intervals of time.

Another feature of the present invention relates to methods and apparatus for determining the magnitude of an electrical quantity and transmitting a series of pulses representative of said magnitude.

Another feature of the invention relates to methods and apparatus for building up an electrical quantity which is proportional to and a measure of the amplitude of a sample of a complex wave at a given instant. This quantity may take on the nature of a conductance.

Still another feature of this invention relates to methods and means for building up of this electrical quantity step by step by an additive or a subtractive process to a total which is proportional to the amplitude of a complex wave.

Another feature of the invention relates to the use of conductances to be so built up by an additive or subtractive process to the total required.

Another feature relates to the transmission of information in the form of a code regarding each conductance added or subtracted.

Another feature relates to methods and means for receiving such transmitted information, decoding and translating it to finally yield a wave form which reproduces with high fidelity the original complex wave.

Still another feature relates to essentially carrying out the steps in the above processes on an alternating current basis at a frequency high compared to the frequencies in the complex wave to be transmitted.

Other features of the invention relate to synchronizing and coordinating the various circuits and equipment at the transmitting terminal with each other and with the circuits and equipment of the receiving end so as to secure proper operation of the entire system.

Briefly, in accordance with the present invention, equipment is provided for generating a control pulse or a group of pulses of predetermined time relation one with another. These control pulses are employed to control a code element timing circuit which circuit in turn generates a series of very short pulses some of which are positive and some negative and some a combination of the two.

Apparatus is also provided for sampling or deriving an electrical quantity which is a function of the amplitude of a complex wave to be transmitted, this sampling means being under control of the control pulse generator. For each of the control pulses a code element timing circuit generates a series of code element timing pulses and these in combination with the sampling means derive an electrical quantity having a magnitude related to the magnitude of the complex wave at the time of the control pulse.

This electrical quantity takes on the character of a conductance which may be varied step by step, operating on the complex wave sample and being controlled by a residual from the sample after reduction to determine the next step of variation in the conductance. More specifically, the electrical quantity is in the nature of a conductance made up of a plurality of conductances of different magnitudes which may be added to each other or omitted in such combinations as to yield a conductance related to the magnitude of the complex wave at the time of the control pulse. The conductance so operates on the sample as to reduce it to a residual which is a fractional part of the original sample amplitude. The residual is tested from instant to instant as a smaller and smaller change is made in the conductance to see whether, within a certain reference limit and at each step, it is in excess of or is below a certain reference level. If, for example, the conductance after any change is such that when operating in connection with the complex wave sample the residual is below the reference level the last previous change is removed; if in excess of the reference level it is left in and the next smaller change is introduced for trial. In the specific illustration of my invention given herewith, the plan is followed that if the magnitude of the conductance due to the last addition leaves a residual of the complex wave less than an arbitrary reference level and is accordingly removed, then an "on" signal is transmitted. If the addition still leaves a residual above reference level and the conductance remains in, then information to this effect is passed to the remote point by the absence of a transmitted signal (an "off" signal), the identification of the information being specified by the time at which the informational pulse is transmitted or not transmitted.

This form of comparing the sample with the conductance is then carried on step by step to as far a point as may be desired and in any case to an extent so that the granularity of the signal finally reproduced at a receiving point will be within the limits of fidelity contemplated for the system.

While thus setting up a code of pulses completely characterizing the amplitude of the complex wave sample, this code of pulses is transmitted. At the receiving station a control pulse generator, a code element timing generator and a system of conductances to be introduced or not introduced, all analogous to those of the transmitting station, are provided. In addition, decoding apparatus is provided in which the received pulses are employed to produce an electrical quantity having a magnitude similar to the magnitude of the complex wave sample of the transmission end of the system and thus the complex wave is reconstructed from a succession of such reproduced wave samples.

The system of this application is related to that of my copending application Serial No. 592,961 filed May 10, 1945. However, it differs in operation from that system in the nature of the steps into which the signal amplitude is quantized. Thus in the present system, the quantization is uniform, the continuous range of amplitudes of the signal being represented by a finite number of discrete and equal steps. In the system of my earlier application the quantization is tapered, the amplitude steps being smaller for low amplitudes than for high and varying logarithmically through the amplitude range. The use of the tapered steps has advantages for certain types of communication particularly telephone systems for the transmission of speech waves. In particular it permits the transmission of a larger range of amplitudes by the use of a given number of digits or code elements. This advantage is achieved at the expense of some distortion or noise for signals at the upper end of the amplitude range because of the availability of a smaller number of larger steps in that range. Consequently for other types of communication the system of the present application with its resulting quantization with uniform steps may be found more advantageous.

The uniform steps of quantization are achieved by virtue of the fact that the electrical quantity which is built up to represent the signal wave amplitude is of the nature of a conductance. This is composed of elements connected in parallel, the composite effect of which is represented by a simple summation. On the other hand in the system of my earlier application the electrical quantity is of the nature of an attenuation that is built up of networks connected in tandem and in which the composite effect is a product. In such a system the digit or code elements represent amplitude in decibels above a reference level as distinguished from my present application where they represent amplitude directly.

The system of this application is also related to that of my application Serial No. 603,990 filed of even date herewith and now Patent 2,464,607 of March 15, 1949. In the system of that patent there are avoided certain limitations on the relative values of the conductance elements which limitations might entail difficulties in some practical applications of the specific system disclosed herein.

Figures 2, 6, 7:
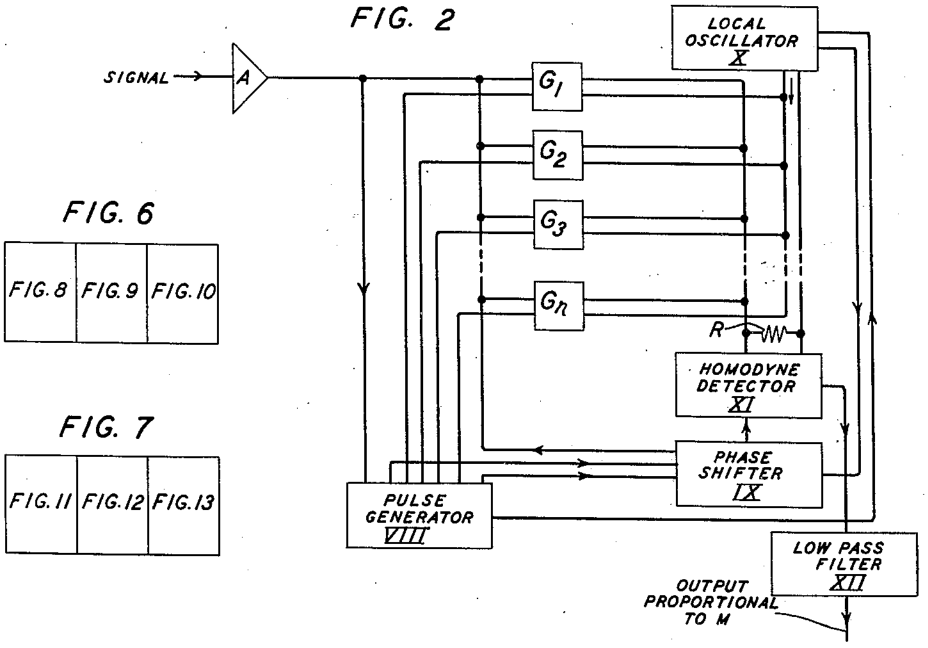
Figure 3:
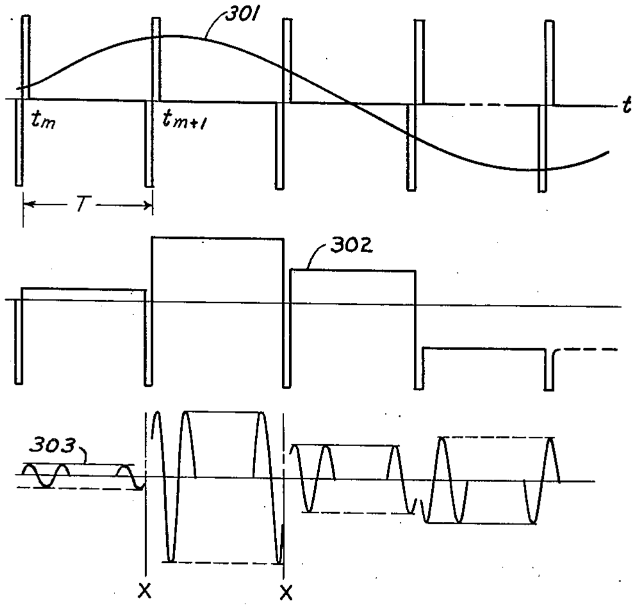
Figure 4:
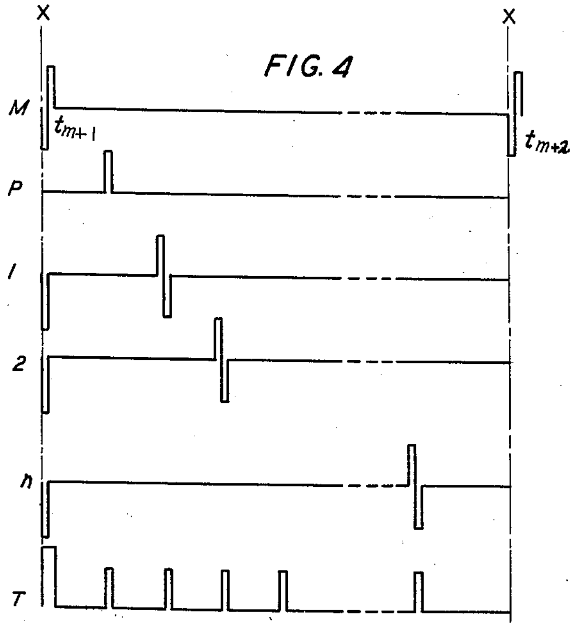
Figure 5:
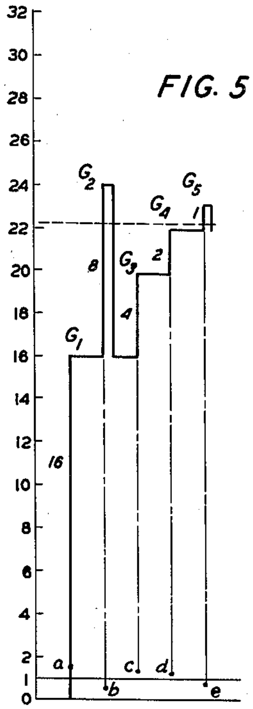

The invention itself both as to its organization and method of operation together with other objects and features thereof will be better understood from the following description taken with the accompanying drawings in which:

Figs. 1 and 2 show in functional block form the various elements and the manner in which they cooperate to form an exemplary communication system embodying the present invention. Figs. 3 and 4 illustrate the timing and nature of the pulses and waves characteristic of my system. Fig. 5 is explanatory of the method and apparatus used for measuring or determining the amplitude of a complex wave sample. Figs. 8 to 13, when positioned as shown in Figs. 6 and 7 give in detail the various circuits and operations of an exemplary system embodying the present invention. Fig. 14 is a modification of a portion of Fig. 12.

Referring more specifically to Fig. 1, let M be a modulating function representative of any complex wave such as a speech wave, a small portion of which is indicated by curve 301 of Fig. 3. A coder or modulator sends out a series of signals after times $$t_m,\ t_{m+1}=t_m+T,\ t_{m+2}+2=t_m+2T$$

and so forth. Each series consists of $1+n$ signals of the "on"—"off" variety. (The signals need not be on or off but each signal distinguishes between two positions called "on" and "off." These might be positions of time, frequency or amplitude. "On" might be transmitted as a current being "off" and "off" as that of current being "on.") The first signal of the series or group is used to tell the polarity of the function M at the time the sample was taken. The next $n$ signals of the group specify the magnitude of M at the time the sample was taken with respect to some arbitrary reference level of voltage or current. These $n$ signals may be of such a character and so combined (advantageously on a binary system and so described in this specification for illustrative purposes) as to represent a large number of different amplitudes. Thus, for the case of eight channels there may be sent, between $t_m$ and $t_{m+1}$, the series of signals—on; on, on, off, on, off, on, off, or 00010101. The first zero carries the information that M is of negative polarity and the remaining signals that M is of amplitude twenty-one units above a predetermined reference level, this value being obtained by binary counting.

One specific means for obtaining such a series of signals is illustrated in the block diagram of Fig. 1. The over-all functioning will be described first and a possible nature of the block units will be described later.

While the functions described could be carried out without frequency conversion, grounding problems are simplified by first impressing the modulating function M on a balanced modulator I of Fig. 1, together with the output of a local oscillator II of frequency $f_0$, high compared with the frequencies occurring in M. At the time $t_m$ shown on Fig. 3, a pulse, which will be referred to as an M pulse, from a pulse generator VI is impressed on I. During the interval T between $t_m$ and $t_{m+1}$, when another impulse is impressed on I, the modulator output current $I_m$ has a frequency $f_0$ and an amplitude proportional to M at $t_m$, being plus when M is plus at $t_m$ and minus when M is minus at $t_m$. At $t_{m+1}$ another sample of the complex wave is taken and for the next interval T the modulator output has the same frequency $f_0$ and the new amplitude. This is indicated in Fig. 3 in which the second line 302 shows the potential across a condenser (later to be described) and the third line 303 shows the oscillations of frequency $f_0$ associated with the successive M pulses. It should be noted that if M is negative, at the time of the last sample as illustrated by the last sample in line 1, this is recorded by a reversal of phase of the modulated current of frequency $f_0$.

$I_m$ is fed to a homodyne detector IV in shunt with conductances $G_1, G_2 \ldots G_n$. Local oscillator power from II is also supplied to IV. At the output of IV there is obtained a voltage or current which increases when M increases, is minus when M is minus and is plus when M is plus, although this output need not be linearly proportional to M.

The output of IV goes to a polarity and amplitude detector V. This serves two purposes. First, after a pulse is applied to modulator I at $t_m$ and after a resetting pulse (later to be described) puts all conductances at a minimum, a pulse is applied to V. If the polarity of M is negative, an impulse is sent to the transmitter VII and this, perhaps in conjunction with a pulse from VI, causes the transmitter to send an "on" signal. If the polarity of M at $t_m$ is positive, V sends no pulse to VII and either VII emits no signal, meaning "off," or a pulse from VI causes VII to send an "off" signal.

The conductances, $G_1 \ldots G_n$, are electrically controlled. Control of these from "off" to "on" position causes changes in conductance corresponding to the digits of a binary number of the type mentioned. Thus, for the case previously given of $1+n=8$, the total conductance is specified by seven digits. Turning the various G's off and on in this case changes conductance by the amounts listed below:

| | |
|---|---|
| Minimum conductance | $G_m \ll G_0$ |
| Change caused by $G_1$ | $64G_0$ |
| Change caused by $G_2$ | $32G_0$ |
| Change caused by $G_3$ | $16G_0$ |
| Change caused by $G_4$ | $8G_0$ |
| Change caused by $G_5$ | $4G_0$ |
| Change caused by $G_6$ | $2G_0$ |
| Change caused by $G_7$ | $G_0$ |

Thus the total conductance range is $G_0$ to $127G_0$ in steps of $G_0$. This makes possible a range of about 42 decibels with respect to the smallest step. The conductances $G_1 \ldots G_n$ are controlled electrically by (a) pulses from the pulse generator VI, (b) the amplitude output of the polarity and amplitude detector V. The character and timing of these pulses are shown in Fig. 4 which is an expansion of the time interval between two sampling pulses or the time required for one cycle of operation. Here the second time interval T is shown expanded. The negative portion of the M pulse resets the modulator I and the positive portion immediately thereafter takes the sample of the complex wave. At the same time the initial negative pulse shown on lines 1 to $n$ of Fig. 4 places all G's in the minimum conductance positions. In the meantime the sample of the complex wave operates on the homodyne detector IV. Then a polarity pulse at a time indicated by the P line of Fig. 4 is applied to V and information on the polarity of the sample of the function M is transmitted. Following this, a positive pulse is applied to $G_1$ at a time indicated by line 1 of Fig. 4. This puts in $64G_0$ of conductance. Immediately thereafter a negative pulse is applied to $G_1$. If the residual amplitude of the output of IV is still above an arbitrary reference level, despite the decreased potential drop across $G_1 \ldots G_n$, the condition of $G_1$ does not change and the conductance stays in. No impulse is sent to transmitter VII and either no signal is sent, indicating "off," or a definite "off" signal is sent by a pulse from VI. If, however, the residual amplitude falls below the arbitrary level on the insertion of this conductance, then it is removed by the negative pulse and at the same time an impulse imparting that information is sent to the transmitter VII. This, perhaps in combination with a pulse from VI, causes VII to send an "on" signal.

Next, positive and negative pulses are applied in turn to $G_2 \ldots G_n$ at instants indicated by lines 2 to $n$ of Fig. 4, resulting in insertion of conductance and transmission of "off" signals or in insertion and subsequent removal of conductance and transmission of the "on" signals.

After the $1+n$ signals specifying the polarity and the amplitude at $t_m$ have been sent, VI sends a resetting pulse to the conductances. This puts all G's at minimum conductance position. This pulse may also send a "marker" signal from the transmitter denoting the end of one interval or cycle of operation and the beginning of the next. This pulse may be simultaneous with the M pulse applied to I.

In a review of the operation of the system, reference may be made to Figs. 3 and 4, showing the character and time spacing of the pulses required from the pulse generator VI. At the top there is shown a series of pulses coming over the channel M from the pulse generator VI to the modulator I and a sample of the complex signal wave at the instant of each modulator pulse is taken. Operating on an electrical element the sample causes the modulator to emit, until pulsed again, a current $I_m$ of frequency $f_0$ and amplitude proportional to M at $t_m$. All this is indicated in the second and third lines 302 and 303 of Fig. 3. A polarity pulse to the polarity and amplitude detector V arrives an interval later and this is succeeded by pulses over the channels 1, 2 . . . $n$ which operate on the conductances $G_1$, $G_2$ . . . $G_n$. There is also a pulse channel T to the transmitter, necessary if the "off" signals are transmissions and not merely omissions. All this is shown in Fig. 4 which is an expansion on a time basis of one of the sampling periods of the system.

At the time of the M pulse, channels 1 to $n$ are pulsed with strong negative pulses setting $G_1$ . . . $G_n$ in the minimum conductance positions. Next the polarity and amplitude detector V is pulsed. This results in a pulse to the transmitter VII if the polarity is negative and an "on" signal, or no pulse to VII if the polarity is positive and an "off" signal.

The $n$ amplitude channels are pulsed in sequence, each first positive and then negative. The positive pulse inserts conductance, the negative pulse removes conductance if the attenuated output of IV has fallen below arbitrary level and in doing so sends an "on" signal, otherwise the conductance stays in and there is an "off" signal. The channel T may apply pulses to the transmitter VII at all times whether an "on", an "off" or a "marker" signal is to be sent. These pulses alone will give an "off" signal from the transmitter but in combination with a pulse from $G_1$ . . . $G_n$ or V will give an "on" signal. Channel T may be omitted in which case "off" signals will be omissions.

While a number of different types of devices may be contrived to perform the functions of the representative blocks of Figs. 1 and 2, a better understanding of the invention will be obtained by specific illustrations of circuits to accomplish the desired ends. These will now be described but it is to be understood that they are illustrative only and that my invention is not limited to the specific circuit arrangement shown.

Figure 8:
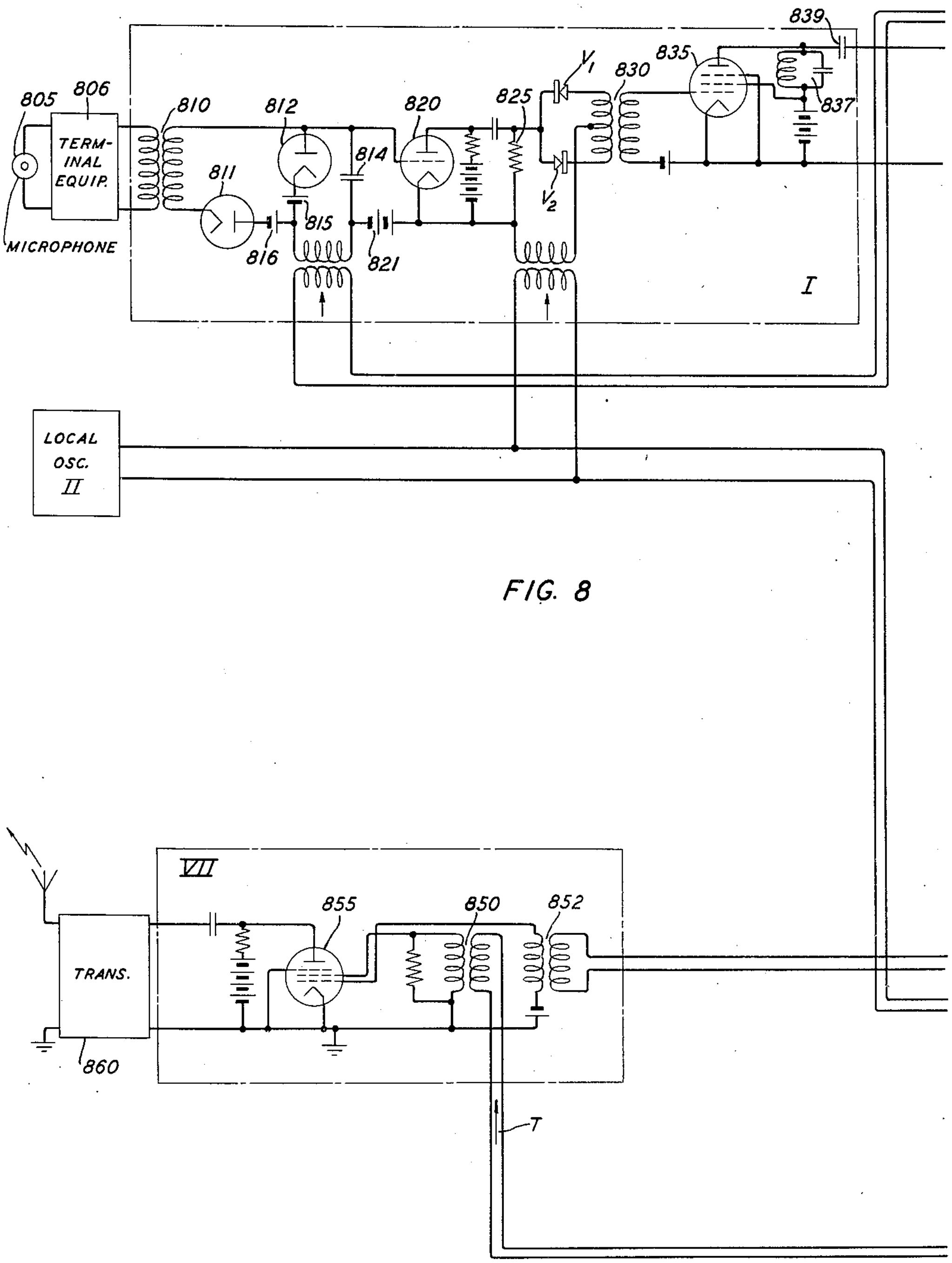
Figure 9:
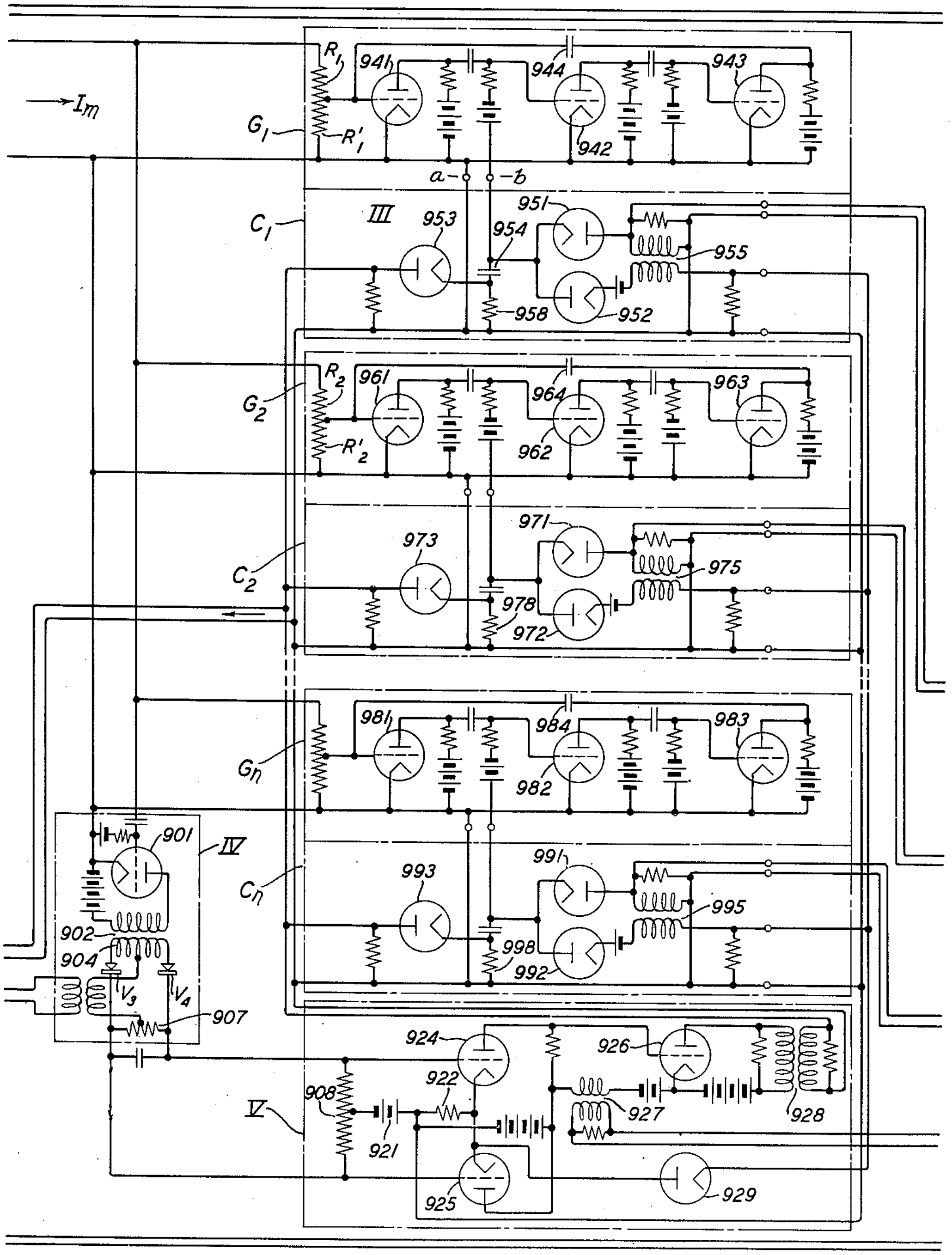
Figure 10:
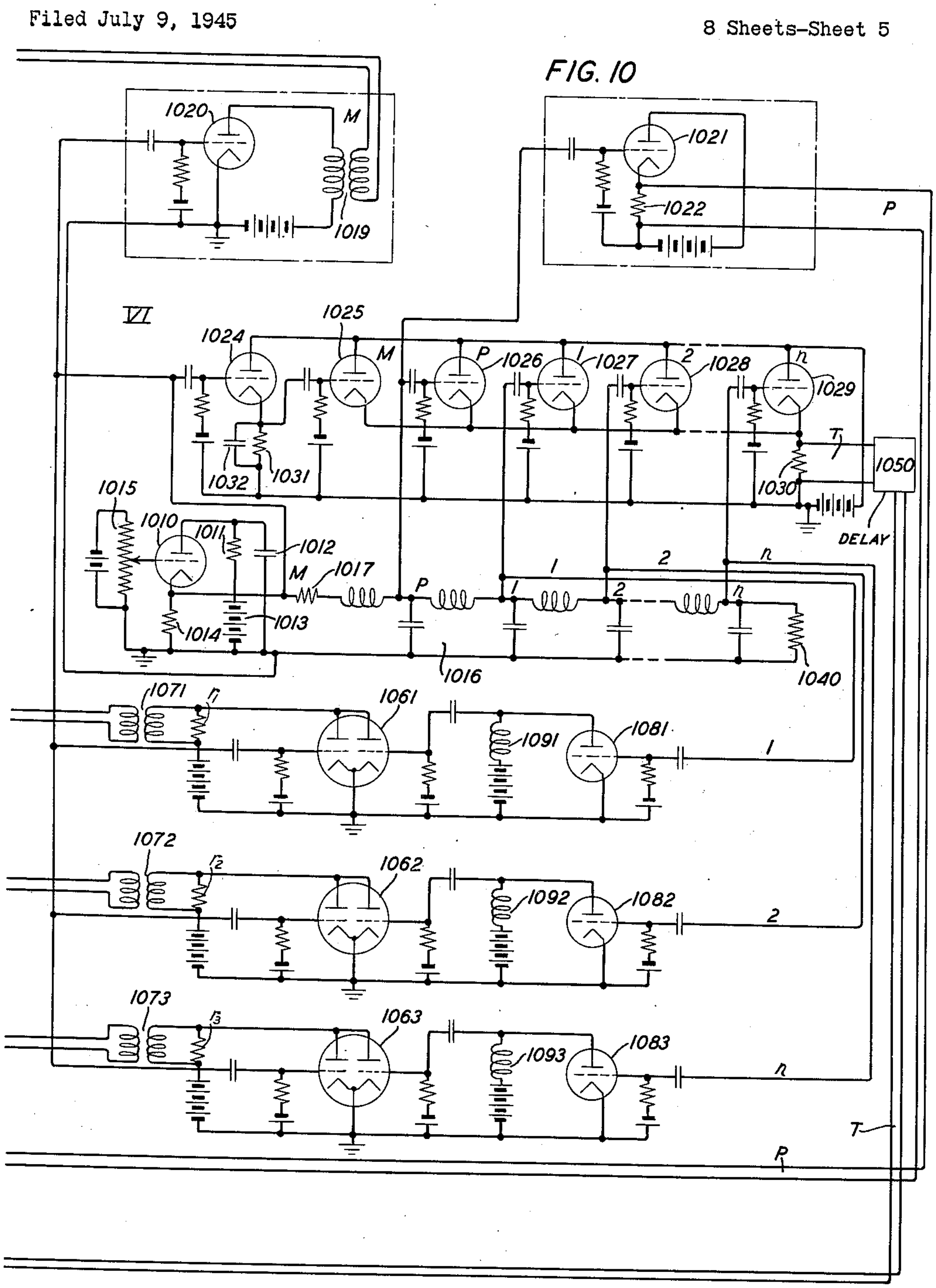
Figures 11, 14:
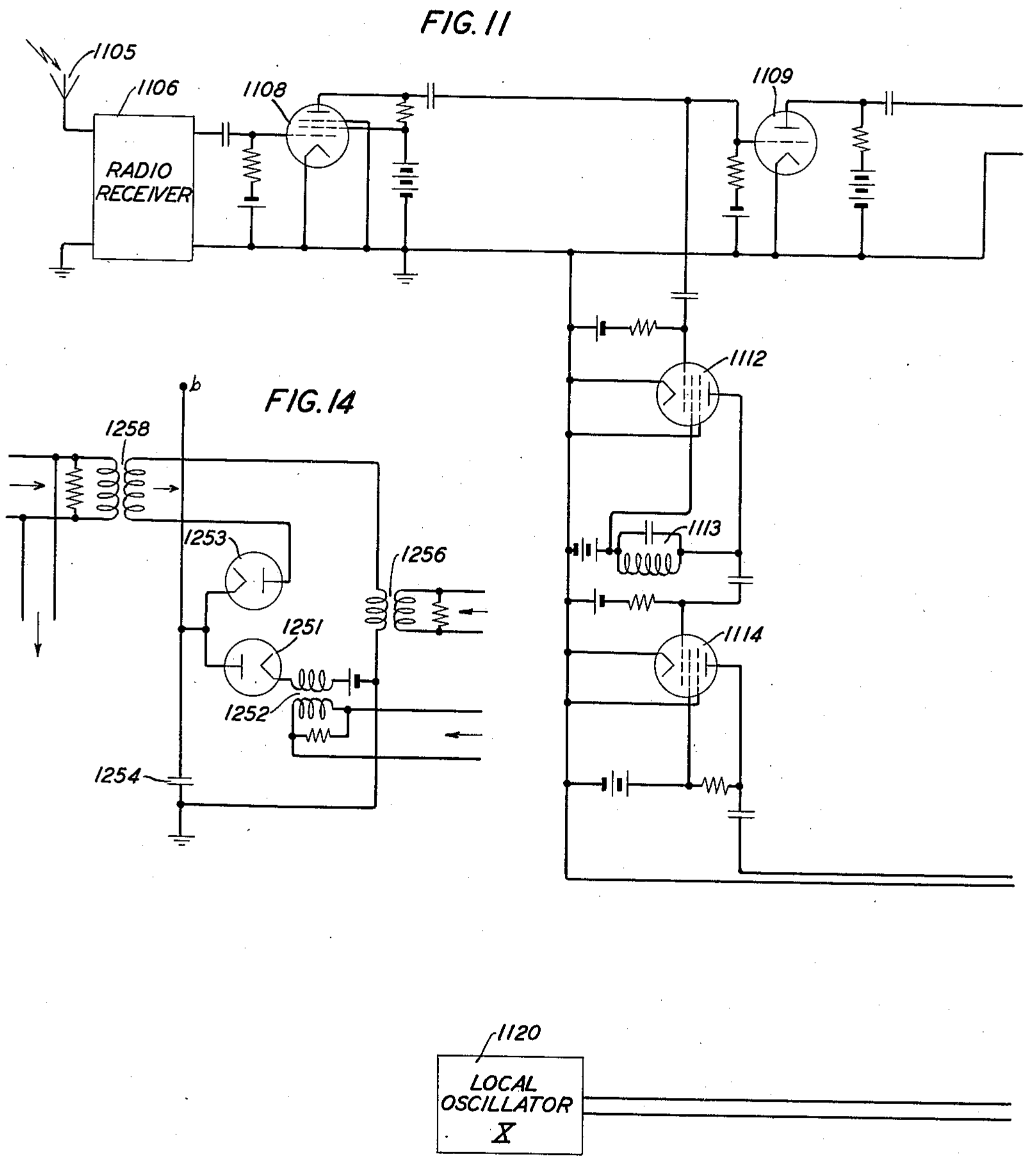

For a description of the transmitting end of my system, reference should be made to Figs. 8, 9 and 10 in which the various block components of Fig. 1 are represented by the same Roman numerals.

The complex wave transmitted is impressed on the balanced modulator system I, this complex wave having come from any suitable source such as a microphone 805 through appropriate terminal equipment 806. It is then sampled periodically and goes through the process to be described in further detail.

*Pulse generator VI*

It will be advantageous to now describe the pulse generating system VI, one form of which is shown in detail in Fig. 10. The first controlling element in this portion of the system is a relaxation oscillator comprising a gas tube 1010. This relaxation oscillator is of a form well known in the art and includes a resistance 1011 for charging a condenser 1012. Assuming that to start with the condenser 1012 is discharged then on closure of the circuit it is charged at a rate determined by the resistance 1011. When the potential of the condenser and the plate of tube 1010 rises to a 'firing" value, the condenser suddenly discharges through the tube and resistor 1014. The duration of the discharge is short and gives rise to a sharp positive pulse across the resistor 1014. The duration of this pulse and the rate at which it is followed by identical pulses can be completely controlled by the parameters of the circuit; in particular, by the values of the elements 1011 to 1014 taken with the potential of the grid of tube 1010 as determined by the potentiometer 1015. While any of several forms of relaxation circuits may be used at this point the one shown is simple and satisfactory. Its operation is more fully described in many places, such as on page 184 of "Ultra-High Frequency Technique" by Brainerd et al., published by Van Nostrand Company, 1942.

The positive pulse from 1014 is now used to control the emission of pulses to various parts of the circuit. This is accomplished by connecting across the element 1014 a delay circuit 1016 made up of identical sections of inductance and capacitance connected seriatim. A positive pulse travels through this network, the time of arrival at each section being uniformly spaced and giving rise to corresponding positive pulses going out over channels 1, 2 . . . $n$ for purposes to be described. The delay network is terminated by a load 1040 of proper value to suppress any reflected wave.

The parameters of the relaxation oscillator may be adjusted so that pulses are derived across resistance 1014 at any frequency desired. For the purposes of my invention it is preferred to have a sampling frequency higher than that of the highest frequency component in the complex wave to be transmitted. If, for example, this wave is to be a speech wave and it is desired to transmit all components up to 4,000 cycles then there should be at least two samples per cycle of this highest frequency component. A suitable value, therefore, for the relaxation oscillator frequency would be 8,000 cycles although a higher value may be used if desired.

By means of the delay circuit or "timestick" 1016, one has available at the ends of the respective sections, positive pulses similar to that initiated in 1014 and spaced in time, one after the other by an interval determined by the elements in a section of the timestick. At time $t_m$ when the pulse is formed at 1014 (or M) it is transferred immediately to tube 1020 and is then transferred to I as the M pulse of Figs. 3 and 4. The function of this pulse will be described hereinafter.

At one element of time later the positive pulse from 1014 will have reached the point P on the timestick and this will be identified as the P pulse. This P pulse operates on the grid of tube 1021 to give a positive pulse over the resistor 1022 which pulse is transmitted to the polarity and amplitude detector V, appearing there as a positive pulse of a form and at a time indicated by line P of Fig. 4.

At the end of succeeding elements of time the positive pulse from 1014 will arrive at points 1, 2 . . . $n$ of the timestick and then be transferred respectively to the grids of tubes 1081, 1082, 1083, etc. Each of these pulses in its subsequent path is converted into a positive-negative pulse in a manner and for the purpose hereinafter described.

In addition to these pulses it is desired to send a group of corresponding pulses to the transmitter VII which pulses will be identified as T pulses and are indicated in the bottom line of Fig. 4. It will be noted that the first pulse in this cycle as it goes to transmitter VII is longer and of greater amplitude than the subsequent pulses, this for reasons which will appear later. The first T pulse may, for instance, be approximately twice the length of the subsequent pulses and perhaps double the amplitude. For the formation of the T pulses a chain of tubes 1024 to 1029 is provided. The grid of tube 1024 is operated on directly by the pulse from M. In the cathode circuit there is included the resistance 1031 paralleled by the condenser 1032. A positive pulse is generated across 1031 and the duration of this pulse would ordinarily be the same as the duration of the M pulse. However, the addition of a condenser 1032 will lengthen this pulse and the condenser is so chosen as to approximately double the duration. The positive pulse from 1031 is applied to the grid of 1025, the cathode circuit of which includes the resistor 1030. At the time of the M pulse on the timestick there is then transmitted over the T channel to the transmitter VII a positive pulse of approximately twice the duration of the M pulse. The relative magnitude of this pulse can be controlled by adjusting the resistance 1017 in series with the timestick 1016. As the positive pulse over 1014 reaches successively the points P, 1, 2, . . . $n$ the grids of the tubes 1026 to 1029 are operated upon and set up positive pulses across 1030 which is a common cathode resistor for all the tubes 1025 to 1029. Consequently, there is transmitted the desired series of positive pulses to the transmitter VII indicated in Fig. 4. For the purpose of synchronizing these pulses with the remainder of the equipment, delay circuits may be introduced wherever necessary. One such delay circuit is shown in the T channel at 1050.

Following the M pulse and the P pulse the number of sections in the timestick will usually be made equal to the number of digits required for setting up the amplitude code to be transmitted from VII. If there should be $n$ of these then the number of possible codes by permutation of "on" and "off" signals would be $2^n$. Thus, if the number of digits in the code is seven this will make possible 128 combinations so that in the system it will be possible to discriminate between amplitudes of 128 different values.

Associated with conductor 1 from the timestick and tube 1081 is a circuit comprising tube 1061 and transformer 1071. The tube 1061 is shown as a double triode. The grid of the left-hand section of this tube receives a relatively large positive pulse at $t_m$ which is then converted at the plate to a negative pulse. This negative pulse is transferred through transformer 1071 as a negative pulse to the control of the corresponding conductance device $G_1$ in Fig. 9 and serves as hereinafter described to set this conductance element to a minimum conductance. Shortly thereafter a positive pulse arriving over conductor 1 to tube 1081 is inverted and appears as a negative pulse on the grid of the right-hand section of tube 1061. However, the load circuit of tube 1081 includes the inductance 1091 which causes the negative pulse generated on the plate of 1081 to be immediately followed by a positive pulse so that the pulse arriving on the grid of the right-hand section of 1061 is a negative-positive pulse. This pulse in turn is inverted by the right-hand section of tube 1061 to a positive-negative pulse which is then transmitted through the transformer 1071 to the control circuit of conductance $G_1$. The character and timing of this positive-negative pulse is that indicated in line 1 of Fig. 4.

A similar circuit is associated with each of the conductors 2, 3 . . . $n$ to give at the time of the M pulse a relatively large negative pulse to the corresponding conductance control devices setting each conductance to a minimum conductance and at a later time transmitting a positive-negative pulse to the control devices of the respective conductances in the same manner and at times indicated by lines 2 to $n$ of Fig. 4.

Various electrical elements are employed in the circuit associated with each of the tubes thus far described. Thus across the primary of the transformers 1071, etc. there are employed the resistors $r_1$, $r_2$, and $r_3$. These are present elsewhere also and they are for the purpose and of a value to sharpen the pulses which are transmitted by the corresponding transformers and to suppress their differentiating action, thus preventing the setting up of an additional reverse pulse. Other elements all serve purposes well known to those skilled in the art and need not be described further.

*Modulator I*

A description will now be given of the modulator circuit I as shown in Fig. 8. A complex wave made up of numerous frequency components, the highest one of interest being for the present taken at 4,000 cycles, arrives at the primary of transformer 810. At time $t_m$ a positive pulse arriving on the grid of tube 1020 is inverted by transformer 1019 and is impressed as a negative-positive pulse on the plate and cathode of diodes 811 and 812. The negative pulse causes current to flow through 812 and discharges condenser 814. When the positive pulse arrives immediately thereafter it causes current to flow through 811 charging the condenser 814 to a definite potential, this potential being equal to the positive pulse plus that of the amplitude of the complex wave M at $t_m$ minus a constant bias potential determined by battery 816. The grid of triode 820 is held at this potential minus a bias potential due to 821 until another pulse is applied at $t_{m+1}$. The output of the amplifier tube 820 appears as a voltage across the resistance 825 and controls the operation of a conventional balanced modulator of any suitable form. As here shown it involves two varistors $v_1$ and $v_2$. Associated with this balanced modulator is also a source of local oscillations II of frequency $f_0$ large compared to the pulse frequencies present in the system. In a manner well understood in the art there will appear in the secondary of transformer 830 a wave of carrier frequency $f_0$, the amplitude of which will be proportional to the potential across resistor 825 produced by tube 820. The phase of the voltage in the secondary of 830 reverses as the voltage across 825 reverses. The output of the secondary of 830 is connected to the grid circuit of a pentode 835 which in turn yields an output current $L_m$ which is almost independent of the load consisting of a resistor or an antiresonant circuit 837 and associated elements appearing hereinafter.

*Local oscillator II*

The local oscillator II may be any one of the suitable forms well known in the art yielding a substantially sinusoidal output of reasonably constant frequency.

*Homodyne detector IV*

The load circuit of the pentode 835 includes the plurality of conducting elements $G_1$, $G_2$ . . . $G_n$ of Fig. 9 connected in parallel to each other and controlled in a manner hereinafter described. The total current flowing through these conductances in parallel, with whatever value they may possess, is given by $I_m$ for, as pointed out above, this value of current from the pentode 835 is substantially independent of the value of the conductances.

Connected also as part of the load circuit of pentode 835 is the homodyne detector circuit IV, the purpose of which is to demodulate the current $I_m$. The homodyne detector comprises a tube shown as a triode 901, the purpose of which is to serve as an amplifier but still more to be of a character to add no appreciable conductance across the load circuit of pentode 835. Associated with the output of 901 through the transformer 902 is a demodulator circuit 904 comprising two varistors $V_3$ and $V_4$. It is supplied with oscillations from the local oscillator II. The output of this demodulator will give a voltage across resistor 907 of magnitude dependent on the amplitude of $I_m$ and the introduced conductances. As long as the high frequency current $I_m$ is in one phase as represented in the expanded portion of Fig. 4, one terminal (say the right-hand terminal) of resistor 907 will be positive and this will be referred to as a positive output. If, however, the magnitude of the complex wave takes on a negative value, as shown by the fourth pulse of line 1, Fig. 3, the high frequency wave appearing at the secondary of 830 will reverse in phase, still being of an amplitude proportional to the sample. Thus, the polarity of the voltage across resistor 907 will also reverse. In this way the homodyne circuit yields information which later is used for detecting the polarity and amplitude of the complex wave sample.

*Polarity and amplitude detector V*

The polarity and amplitude detector V is shown in the lower box of Fig. 9. If the homodyne detector output over the resistors 907 and 908 is above some arbitrary reference level controllable by bias 921 current flows in one or the other of the triodes 924 or 925. If the homodyne output is in the direction to raise the potential of the grid of 924 and has sufficient amplitude then the grid of tube 926 will be highly negative. Therefore, a pulse coming from tube 1021 and applied in the grid circuit through transformer 927 will cause no pulse in the output of tube 926 and no pulse on the line leading therefrom to the transmitter VII. If the homodyne output has the opposite polarity, the grid of 926 will be only slightly negative and the pulse through transformer 927 will cause plate current to flow, sending a pulse to the transmitter via transformer 928.

If the output of the homodyne detector is larger than an arbitrary value in either direction current will flow in diode 929 because of the drop over resistor 922 caused by the flow of current through the respective tube 924 or 925 thus applying a positive bias to the electric conductance control and preventing a negative pulse coming from the pulse generator to that control from removing the conductance.

*Conductance III*

In Fig. 9 there are shown a plurality of conductances and conductance control circuits one for each digit in the amplitude code. Three such units are shown but inasmuch as their action is identically the same except for timing it is necessary to describe only one of these, identified by the block III which includes the first conductance $G_1$ of the series. Each of the units III comprises a controllable conductance circuit and a controlling circuit.

The conductance circuit is essentially a shunt feedback amplifier. It includes the resistances $R_1$ and $R_1'$ connected in series, the intermediate point being connected to the three-stage amplifier including the tubes 941, 942 and 943 with resistance capacitance coupling, there being a feedback connection from the plate of the last tube 943 through condenser 944 to the grid of 941. It will be appreciated that some other form of coupling, as antiresonant circuit coupling may be used. There is either zero or a very large gain around the loop depending on whether the control voltage applied to terminals $a$ and $b$ cuts off one or more tubes in the loop or allows them to operate. In this instance the loop is opened by a sufficiently high negative bias on the grid of tube 942. Under these conditions the conductance $G_1$ is essentially $$\frac{1}{R_1+R_1'}$$

If a positive potential of sufficient magnitude arrives at the point $b$ then the loop is closed and if the gain through the circuit is high $R_1'$ is virtually short-circuited and $G_1$ is essentially $1/R_1$, almost independent of gain. Thus, a high accuracy of control of $G_1$ can be attained independent of tube characteristics. Whereas, for illustrative purposes, the control has been shown on one tube only it may be desirable to control the bias on several or all tubes in order to open the loop completely.

The control part of the conductance comprises a plurality of diodes 951, 952 and 953 and associated elements. When a positive pulse over channel 1 arriving through tube 1081 of Fig. 10, is applied the diode 951 conducts, charging the condenser 954, applying a positive potential to $b$ and closing the feedback loop thus increasing the conductance $G_1$. Immediately thereafter a negative pulse is applied through transformer 955 to diode 952. If this is the only pulse present on 952, that is, if insufficient positive bias arrives from the amplitude and polarity detector V, meaning a homodyne detector output below a certain reference, the negative pulse discharges condenser 954 and opens the feedback loop thus removing the conductance. At the same time current flows in resistance 958 and through diode 953 sending a negative pulse to the transmitter, resulting in the transmission of an "on" signal. If there is a positive bias of sufficient magnitude from the amplitude detector through diode 929, meaning a large homodyne output, the negative pulse through transformer 955 is not sufficient to cause current to flow through diode 952. Consequently the conductance remains in and no pulse is sent to the transmitter.

If the conductance $G_1$ remains in, the residual signal arriving at tube 901 is correspondingly attenuated. With the arrival of the next pulse, corresponding to channel 2, the sample is again tested by the introduction of conductance $G_2$, and its removal or not depending upon the amplitude of the sample, i. e., an amplitude of the voltage applied to the input or grid of tube 901.

This is made clearer by reference to Fig. 5 in which for simplicity it is assumed that, exclusive of the polarity pulse, a five-place amplitude code is to be used on a binary basis. This makes it possible to discriminate between thirty-two different amplitudes. Let the reference level $V_0$ be one unit of potential difference, (say 1 millivolt) such that if on the introduction of a conductance the residual reaching the tube 901 is more than this amount the conductance is left in but if less than this the conductance is removed.

If, for illustration, the sample amplitude is slightly over 22 units on the scale 32 as shown at the left of Fig. 5 than $G_1$ is such a conductance that its introduction by the pulse over channel 1 reduces the voltage reaching tube 901 by the factor 16, that is, to $$\frac{22+}{16}$$

The residual is more than the reference level of one, as shown at *a* of Fig. 5, and the following negative pulse does not remove $G_1$ for the system now "knows" that the amplitude was more than 16. Had it been less than 16 the residual would be less than one and $G_1$ would be removed. The positive pulse over channel 2 now introduces $G_2$, of conductance value 8, giving a total conductance of 24 units and a reduction of the residual to $$\frac{22+}{24}$$

less than reference level, as indicated at *b*, and so the negative pulse quickly removes it. The pulse over channel 3 now introduces $G_3$, of conductance value 4, giving a total of 20 units and a reduction of the residual to $$\frac{22+}{20}$$

as shown at *c*, more than reference level and so it stays in. The next step adds $G_4$, of conductance value 2, giving a total of 22. The residual is now $$\frac{22+}{22}$$

slightly over the reference level, as shown at *d*, and so $G_4$ stays in. On the next step $G_5$, of one unit conductance, is added and brings the total conductance to 23 and the residual is $$\frac{22+}{23}$$

slightly less than unity as shown at *e*. Whether $G_5$ should remain in or be removed will depend on whether the 22+ is nearer to 22 or to 23. The marginal operation of the circuits is so adjusted that if the amplitude were in excess of 22.5 the following negative pulse to $G_5$ would not be sufficient to remove it. If less than 22.5 (which was assumed in this case) the negative pulse will remove it. Thus the total conductance added in front of tube 901 is 16+0+4+2+0=22 and the corresponding code of off, on, off, off, on (or the equivalent of +−++−) will have been set up.

On the completion of this process the drop across $G_1 \ldots G_n$ has been adjusted as nearly as possible to the constant arbitrary reference voltage $V_0$. Thus $$V_0=\frac{I_m}{G_1+G_2+\ldots G_n}=\frac{I_m}{G_t}$$

Since the conductance $G_t$ is given by the binary number represented by the *n* "off" and "on" signals, this number of also expresses the amplitude of current $I_m$ and hence the amplitude of M at $t_m$.

By using a six-place code the system would define any of sixty-four different amplitude values. By extending this to a higher number of code signals any degree of fineness of granularity and corresponding fidelity may be obtained.

In any event it will appear from the above explanation that the final conductance obtained is proportional to the amplitude of the sample within one-half of the reference level unit.

It will be observed that this mode of building up conductance to match a sample amplitude is essentially an additive process, starting with large steps and going to smaller ones until the last degree of fineness contemplated has been attained. This is illustrated in Fig. 5. From another point of view the process followed is a subtractive one in that with the introduction of each conductance the output portion of the voltage generated in the tube 835 is reduced by subtraction until a value nearest the reference level is attained. This additive or subtractive characteristic is peculiar to this system and constitutes a distinguishing feature as will be pointed out in the appended claims.

There is a small error in the above illustrative calculations due to the fact that minimum conductance is not zero, although very small, i. e., $G_m \ll G_0$. However, the same condition holds at the receiver in reverse order so that in practice the apparent error falls out. The important point is that a certain combination of conductances is set up at the transmitter and means are provided for setting up identically the same or proportional conductances at the receiver.

During the setting up of the conductances, pulses modulated on a suitable carrier will have been transmitted from VII bearing the information to the remote station on what conductances are being introduced. The amplitude of each of the pulses so transmitted from VII will be the same and each element of the signal is purely an "off" and "on" matter. Since only integers are sent, such a signal can be repeated indefinitely without adding distortion or noise to the recovered intelligence, even through distortion and noise below a certain threshold level may be present in the repeaters. Thus, even for very high quality transmission the requirements on the repeating units are very low. This makes possible transmission over long paths with frequent repeating. The presence or introduction of noise in the transmission path from VII to the remote receiving station will have no influence so long as the noise thus introduced is relatively small compared to the amplitude of the signal being transmitted over the path. Such noise therefore will not appear in the signal later reproduced.

*Transmitter unit VII*

During this procedure there has been arriving at transformer 850 a series of pulses over channel T, one for each pulse from the pulse generator, timed as indicated on the bottom line of Fig. 4. These pulses may be used to operate on a grid of the tube 855. In addition, there arrives at the transformer 852 certain pulses, one for each "on" pulse, relating to polarity or indicating that one of the conductances has been introduced and then removed. No pulse will come to the transformer 852 if a conductance has been introduced but not removed, this corresponding to an "off" signal. The secondary of the transformer 852 may operate on a second grid of tube 855 and this tube in turn controls the transmission or absence of transmission over a suitable medium to a remote station. In Fig. 8 it is shown as controlling a transmitting terminal unit 860 for a radio channel on a suitable carrier but it is to be understood that the pulses coming from the tube 855 may go directly to any suitable transmission path such as a pair of wires, a coaxial cable, etc. In such cases it is not necessary and may not be desirable to use the pulses for modulating a carrier. The connection of the transformers 850 and 852 are such that a pulse arriving at 850 alone will not cause the transmission of a signal but the simultaneous presence of a pulse on 850 and on 852 would be effective in causing such transmission and would correspond to an "on" signal. This is true except in the case of the first broad pulse of the T series which is purposely made greater in amplitude than the other so that it can operate tube 855 alone. But all pulses are preferably clipped to the same amplitude before actual transmission. The purpose of the pulses coming over the T channel is to assure proper timing coordination of the transmission of signal pulses. In some instances such added precaution will not be necessary in which case the T channel may be omitted, including the chain of tubes 1024 to 1029 of Fig. 10 and the transformer 850. In this case also the adjustment of the transformer 852 and tube 855 is such that a pulse on 852 will then be sufficient to cause transmission.

*Receiver*

The problem of recovering the modulation function at the receiver is somewhat simpler and will be described by means of the block diagram of Fig. 2. For the example here described pulses forming the signal appear at A for all "on" signals. A pulse generator VIII is synchronized with the incoming pulses, perhaps by means of a marker pulse such as the M pulse from the transmitting station, so that its operations coordinate properly with the incoming signals. This generator sends out pulses to various devices which also receive the signal. These received signal pulses alone cause operation. A signal pulse in conjunction with a pulse from VIII will prevent a device from operating.

At the time when the signal corresponding to polarity appears the pulse generator applies a P pulse to a phase shifter IX. If there is an "off" signal or no signal pulse the phase shifter is set to shift phase 180 degrees; if an "on" signal the phase shifter is set to shift phase zero degrees. The phase shifter remains in this position until receiving another P pulse.

The next pulse of the pulse generator is sent to an electrically controlled conductance $G_1$ which controls a change of conductance proportional to that of $G_1$ of Fig. 1. The conductance is initially at a minimum. If the received signal is an "off" signal, conductance is switched in. If an "on" signal is received this prevents operation and $G_1$ is left at minimum conductance position. The next pulse from VIII goes to $G_2$ at the same time that the signal from $G_2$ of Fig. 1 arrives and so on through $G_n$. Thus, the total conductance is made proportional to that introduced in Fig. 1 which gave rise to the "on" and "off" signals. Then at a short time later, perhaps the next marker pulse corresponding to time $t_{m+1}$ at the sender, a pulse from the pulse generator enables the local oscillator X. This acts as a constant voltage source of desired frequency sending current through $G_1 \ldots G_n$ and resistance R and to the homodyne detector XI. R is made small compared to $(G_1+G_2+\ldots G_n)^{-1}$. From the voltage drop across R there is produced an output pulse from the homodyne detector XI nearly proportional to the amplitude of M at $t_m$. A reset pulse may follow the pulse to oscillator X. This will reset $G_1 \ldots G_n$ and phase shifter IX to the initial position in preparation of succeeding codes. The pulses from the detector XI are passed through a low-pass filter XII. If the highest frequency $f_m$ in the complex wave is $f_m=1/2T$ and if the low-pass filter has a cut-off of $f_m$, a signal proportional to M, but delayed perhaps by T seconds, is recovered at the output of the low-pass filter. Here T is the length of a period between $t_m$ and $t_{m+1}$.

With this brief description of the block diagram of Fig. 2, we may now proceed to a more detailed description of devices which will accomplish the steps set forth above. It will be apparent to those skilled in the art that there are numerous circuit arrangements for accomplishing this. Certain specific circuit arrangements are here shown in Figs. 11, 12 and 13 but these are illustrative for the sake of concreteness and it is to be understood that many variations may be made without departing from the spirit of my invention.

Referring more specifically to Fig. 11 there is shown a receiving unit 1106, here indicated as a radio receiver associated with a suitable receiving antenna 1105. This unit 1106 is a radio receiver of any suitable type including a detector the output of which yields the pulse signals as a reproduction of the pulses arriving at the transmitting unit VII of Fig. 8. This code pulse message is amplified to any necessary extent as illustrated by the tubes 1108 and 1109 and the output of 1109 is shown as going to a plurality of control devices $C_1 \ldots C_n$, one associated with each of a plurality of conductances $G_1 \ldots G_n$, in a manner hereinafter to be described.

*Receiver pulse generator VIII*

Figure 13:
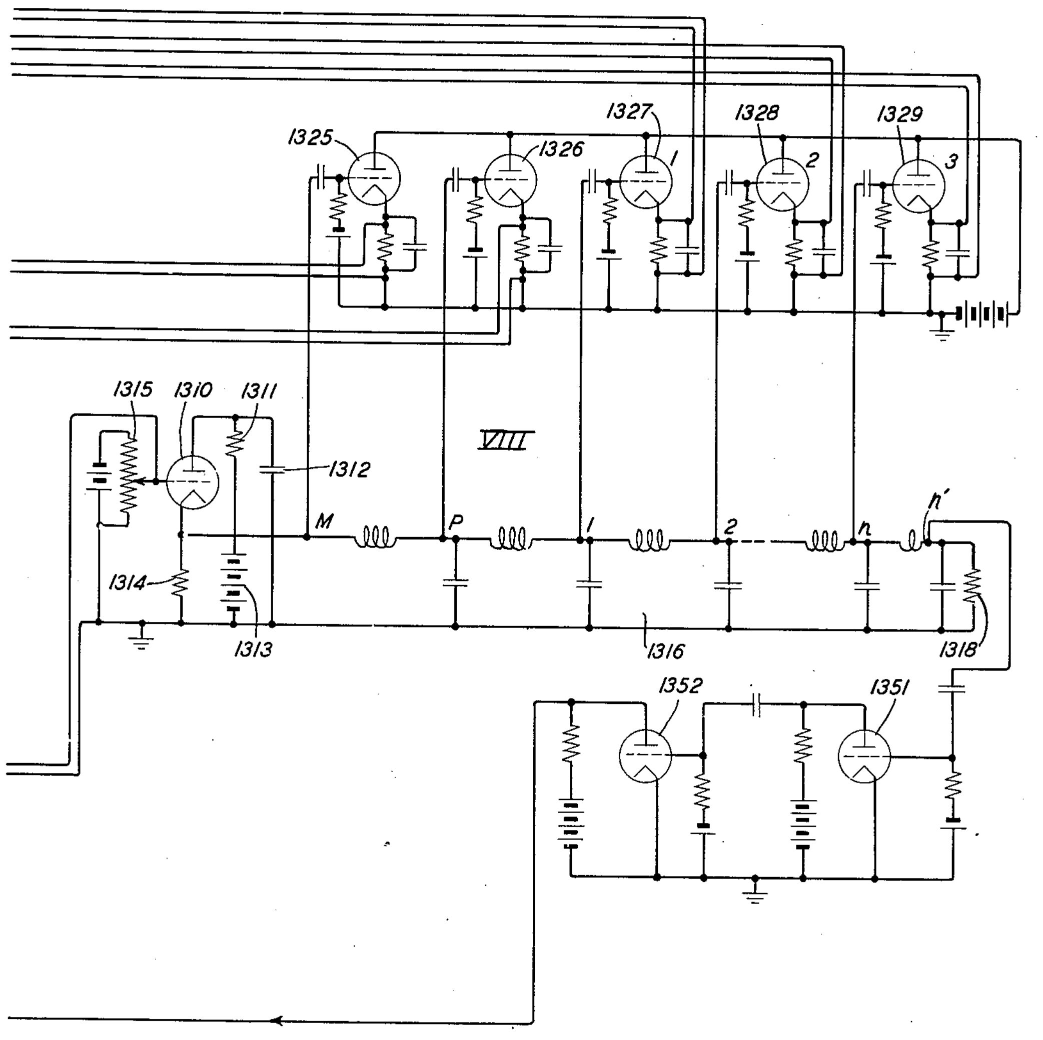

A derived path from the output of 1108 passes through suitable amplifiers as shown at 1112 and 1114 and an output pulse therefrom is used to control a relaxation oscillator shown in Fig. 13. This relaxation oscillator, centering about the gas tube 1310, may be similar in every respect to the relaxation oscillator at the transmitting station and shown in detail in Fig. 10. Corresponding to each of the units 1010 to 1015 in Fig. 10 there are the units 1310 to 1315 in Fig. 13. The adjustment of the parameters in the relaxation oscillator of Fig. 13, however, is such that the circuit does not normally oscillate but is triggered off by a pulse arriving from tube 1114. Furthermore, the parameters of this relaxation oscillator are so adjusted that the circuit will be triggered off by the first pulse in a group (corresponding to the M pulse at the transmitter) after which the oscillator cannot be triggered off until the arrival of the next M pulse.

This is accomplished by the use of the long initial T pulse of Fig. 4 to which reference has been made. It is to be borne in mind that all pulses transmitted by VII are of the same amplitude. However, since the tube 1112 is essentially a constant current device, the voltage built up in the tank circuit 1113 is proportional to the duration of the incoming pulse and thus the pulses arriving at 1310 corresponding to the M pulses will be of greater, perhaps double, amplitude and so be able to trigger the relaxation oscillator, whereas the other pulses in the cycle will not.

In a manner analogous to that of Fig. 10 there is associated with the relaxation oscillator a timestick 1316 from which a series of pulses may be derived with a time spacing as nearly identical as may be necessary to the time spacing of the pulses derived from the timestick at the transmitting station. This timestick has an additional section giving rise to a pulse indicated by $n'$ and delayed only slightly behind the previous pulse. The function of the pulse $n'$ will be given hereinafter. The timestick is terminated with a suitable impedance 1318 to suppress reflection. Also there is a series of tubes 1325 to 1329 from which a series of positive pulses derived from cathode followers is initiated corresponding to the pulses from the timestick.

*Receiver conductances XIII*

Figure 12:
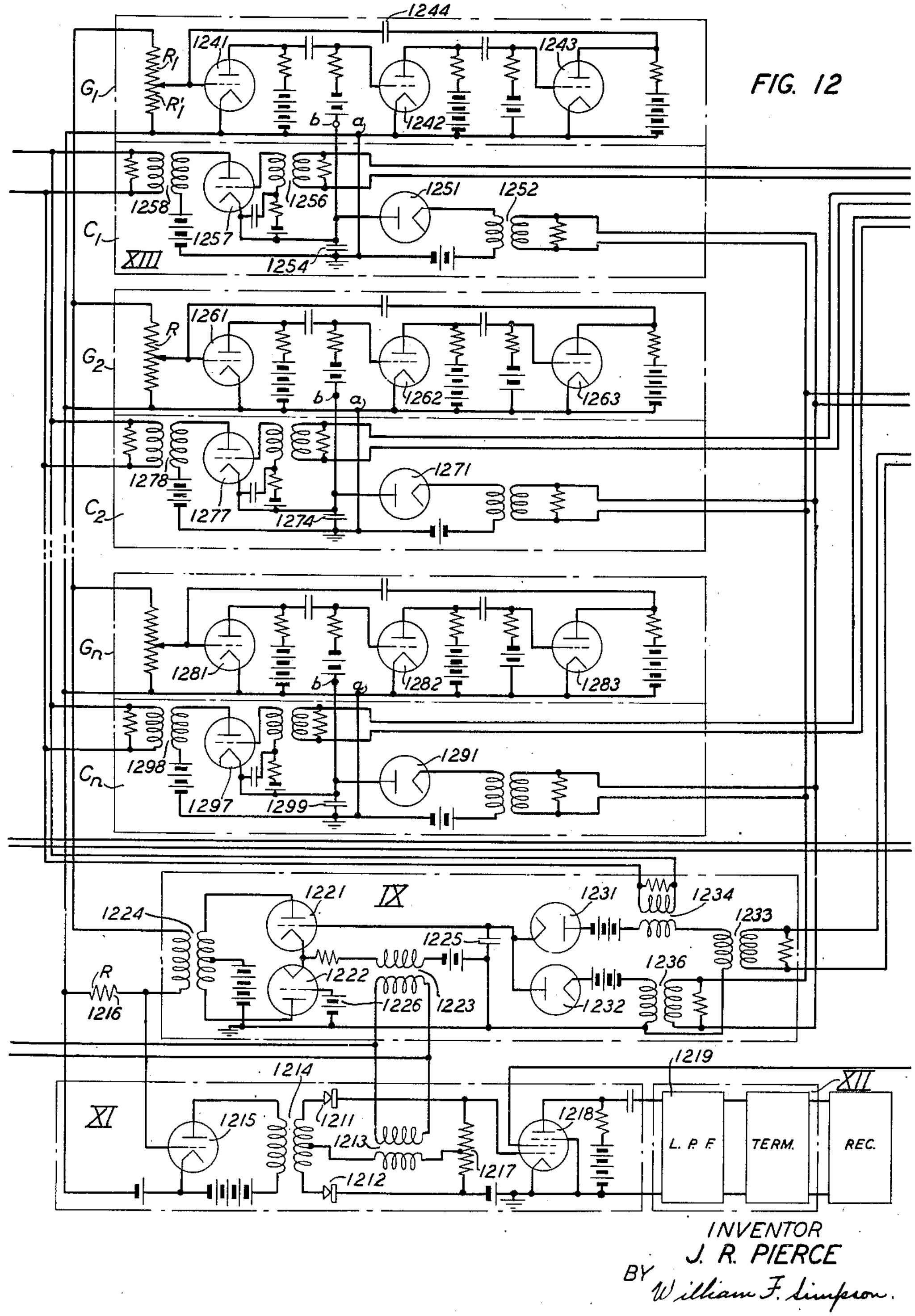

The utilization of the various pulses to control the setting up of a series of conductances $G_1 \ldots G_n$ corresponding to those set up at the transmitting station will now be described. Fig. 12 shows a plurality of conductances $G_1 \ldots G_n$ which may be identical with those at the transmitting station or may be proportional to them. Here again three such circuits are shown but inasmuch as their action is identically the same except for timing, it is necessary to describe only one of these identified by the block XIII including the first conductance $G_1$ of the series and its controlling circuit $C_1$.

The conductance circuit is again essentially a shunt feedback amplifier. It includes the resistances $R_1$ and $R_1'$ connected in series, the intermediate point being connected to the three-stage amplifier including the tubes 1241, 1242, 1243 with resistance capacitance or other suitable coupling, there being a feedback connection from the plate of the last tube 1243 through condenser 1244 to the grid of 1241. There is either zero or a large gain around the loop depending on whether the control voltage applied to terminals $a$ and $b$ cuts off one or more tubes in the loop or allows them to operate. In this instance, as in Fig. 9, the loop is held open by a sufficiently high negative bias on the grid of tube 1242. Under these conditions the conductance $G_1$ is essentially $$\frac{1}{R_1+R_1'}$$

If a positive pulse of sufficient magnitude arrives at $b$ then the loop is closed and if the gain through the circuit is high, $G_1$ is essentially $$\frac{1}{R_1}$$

almost independent of gain. Again, whereas for illustrative purposes, the control has been shown on one tube only, it may be desirable to control the bias on several or all tubes in order to open the loop completely.

The control portion $C_1$ of the conductance may take on a large variety of circuit forms so long as it performs the desired function in response to the pulses reaching it and may comprise one or more diodes or combinations of diodes and triodes or multigrid tubes in a variety of ways as will be clear to those skilled in the art. Specifically, in Fig. 12 it is shown as a combination of a diode with a triode. A positive pulse corresponding to the M pulse from the timestick operates through the transformer 1252 so poled as to make the cathode of 1251 negative, whereupon any positive charge on the condenser 1254 is discharged so the negative bias on the tube 1242 opens the conductance loop. This occurs simultaneously on all of the conductance units at the beginning of a cycle and sets all the conductances at minimum conductance.

In due course a pulse from circuit I of the timestick and tube 1327 arrives at transformer 1256 being so poled as to make the grid of triode 1257 positive, whereupon current flows through the plate circuit to give a positive charge to the upper plate of condenser 1254 thus closing the conductance loop. This is on the assumption that the only pulse acting on the tube 1257 is that coming from the transformer 1256 and this would be the condition for an "off" signal arriving at the receiver. If, however, there has arrived an "on" signal at the same instant then that signal operates through transformer 1258 in the plate circuit of 1257, and when properly poled will balance the effect of the positive pulse on the grid and no plate current will flow. Consequently, condenser 1254 will receive no charge and the conductance loop will remain open. Thus it is seen that conductance $G_1$ will be introduced if the corresponding conductance $G_1$ has been introduced at the transmitting station, and if it has not been introduced at the transmitting station it will not be introduced at the receiving end.

The same operation will take place for each of the conductances $G_2 \ldots G_n$, after which the combination of conductances connected in circuit will be the same as that at the transmitting end.

*Local oscillator X*

The receiving station is provided with a local oscillator X shown in Fig. 11 as 1120. This may, but need not, be of the same frequency as the local oscillator II at the transmitting station. In other words, no synchronism between the two oscillators is required.

*Phase shifter IX*

Phase shifter IX is shown as comprising two triodes 1221 and 1222 the grid circuits of which are supplied in parallel from the local oscillator 1120 through the transformer 1223. The output circuit comprises transformer 1224, the midpoint of the primary of which is connected to the positive terminal of the plate battery. The grid circuit of tube 1221 contains the condenser 1225 and the grid circuit of tube 1222 includes the battery 1226 which tends to give a positive bias to the grid. Normally, therefore, the transconductance of tube 1222 will be higher than that of 1221 and there will be an alternating current of local oscillator frequency in the secondary of 1224. The phase of the circuit in this secondary current may, however, be reversed by means of the phase shifter. This phase shifter comprises two diodes 1231 and 1232 biased so that normally they are non-conducting. When a pulse from the tube 1326 corresponding to P pulse arrives at transformer 1233 it is so poled as to render diode 1231 conducting, giving a positive charge to condenser 1225 of such magnitude as to give tube 1221 a higher transconductance than 1222, whereupon the current in the secondary of 1224 is reversed in phase. This reversal occurs if the pulse code at the transmitter was an "off" signal, meaning an absence of a received pulse. The condenser 1225 is so connected as to retain its charge for the duration of one complete cycle.

If, however, the polarity of the sample of the complex wave at the transmitter had been negative, then an "on" polarity pulse will have been transmitted and, in turn, received at the receiving station. A corresponding pulse, therefore, arrives at the transformer 1234 in parallel with the transformers 1258, etc., at each of the conductance control circuits. The transformer 1234 is so poled that its pulse opposes that of the pulse coming on transformer 1233 and consequently diode 1231 does not conduct, the condenser 1224 does not become charged and the phase of the oscillations in secondary of 1224 is not reversed. At the end of the cycle or the beginning of the next cycle the M pulse from tube 1325 operates through transformer 1236 to make diode 1232 conducting, whereupon the condenser 1225 is discharged or "reset" to normal condition. Through the means thus described it is seen that it is possible to change the phase of the local oscillator current in transformer 1224 by 180 degrees.

The secondary of transformer 1224 is connected in series with a resistance 1216 corresponding to R of Fig. 2. In series with this also is the combination of conductances $G_1 \ldots G_n$. Resistance 1216 is small compared to the resistance of the conductances taken in parallel. Also, the tubes 1221 and 1222 should appear as a low impedance source by any suitable means, such as having tubes of low impedance, or by use of a cathode follower circuit or by a step-down transformer. In this case the current in and the voltage across 1216 will be proportional to the conductances which have been introduced and, therefore, proportional to the sample current or voltage at the transmitter.

*Homodyne detector XI*

The homodyne detector XI comprises a balanced demodulator including varistors 1211 and 1212 connected in a standard bridge circuit. The demodulator is supplied directly with local oscillator frequency through transformer 1213 and also with the same frequency through transformer 1214. The primary of transformer 1214 is included in the plate circuit of triode 1215, the grid circuit of which includes the resistance 1216. Thus the detected current of pulse frequency appearing across resistance 1217 will be proportional to the current in 1214 and therefore proportional to the amplitude of the complex wave sample. Furthermore, its polarity will be determined through the phase shifter IX to correspond with the polarity of the complex wave sample.

The last step of interpretation comes through the multigrid tube 1218. This tube is normally biased to cut off. However, through the additional section of the timestick leading to the pulse $n'$ previously referred to, a positive pulse is impressed on the triodes 1351 and 1352 connected in series to give requisite amplification without change of polarity of the pulse. Very shortly after the termination of the amplitude code there arrives on one grid of tube 1218 a positive pulse of sufficient value to enable the tube 1218 for the duration of the pulse $n'$. During this interval then there appears in the output circuit of 1218 a pulse determined by the magnitude and polarity of the voltage over 1217, which latter is proportional to the amplitude and polarity of the complex wave sample.

These pulses will arrive in succession, one for each sample from the complex wave. By means of the low-pass filter 1219 the undesired high frequency components may be removed and the resulting wave passing to the terminal equipment and the receiver will be a reproduction of high fidelity of the original complex wave at the transmitting station.

In this specification my invention has been described in terms of very specific apparatus. This has been for the purpose of clarity but it will be apparent to those skilled in the art that many substantial variations may be made in the system without departing from the spirit of the invention. For example, Fig. 12 shows a specific arrangement for control of the conductances, which control comprises the diode 1251 and the triode 1257. A modification of this control circuit is shown in Fig. 14 in which the triode is replaced by a second diode 1253. The resetting pulse coming in over the transformer 1252 will discharge the condenser 1254 as before. A pulse from the pulse generator coming over transformer 1256 is so poled as to render diode 1253 conducting if that is the only pulse arriving. This permits the condenser 1254 to be charged and the introduction of conductance, this corresponding to an "off" signal. If an "on" signal arrives it is transferred through transformer 1258 to the diode 1253 but the transformer is so poled that its pulse will oppose the simultaneously arriving pulse over transformer 1256. Consequently, diode 1253 will not be rendered conducting, the condenser 1254 will not receive a charge and the corresponding conductance will not be introduced.

Many other variations should also be borne in mind, for example, the T channel of pulses may be omitted with corresponding simplifications, although with some loss of control. Also the local oscillator at the receiving station may be on all the time instead of being triggered on occasionally, for even if left on it is ineffective at the terminal apparatus unless and until the tube 1218 has been enabled by the pulse coming from $n'$. Still further it will be evident that the modulation and demodulation features of the transmitter station may be omitted, the sample signals out of tube 820 going directly to the input of tube 835 and directly from tube 901 to the resistor 907, or its equivalent, without the intermediation of the demodulator in the homodyne unit IV. This would mean also the omission of the oscillator II. Corresponding alterations could be made at the receiving station in connection with its local oscillator. In general, however, such omissions or simplifications would lead to sacrifice in operation or quality and it would be a matter of engineering judgment as to how far one may carry out such simplifications.

No mention has been made of a specific radio or carrier frequency on which signals will be transmitted to a remote point but it is to be understood that in systems of this type the radio or carrier frequency may take on any convenient value so long as it is high enough to handle the band widths required in the system. For example, it will be appreciated by those skilled in the art that this carrier, whether for direct radio radiation or transmission over coaxial cables, wave guides and similar transmission paths, may lie in and is eminently and peculiarly well adapted for the so-called microwave region. If the transmission is to be by a radio channel then a wide choice of types of equipment is available. A typical example of a radio channel, including radio relay repeater stations suitable for the transmission of pulses of the type employed in the exemplary system described herein, is discussed in detail in a series of papers published in the Proceedings of the Institute of Radio Engineers for November 1934 entitled "An Experimental Television System," by Engstrom et al., comprising four parts, all pertinent to this type of signal. Another suitable type of radio amplifier, repeater and transmitter is described in detail in an article entitled "High Gain Amplifier for 150 Megacycles" by Rodwin and Klenk published in the Proceedings of the Institute of Radio Engineers for June 1940. Suitable and typical wave guides and radiating horns, radiator structures and energy absorbing horns and structures are described in United States Patent 2,206,923 granted to Southworth July 9, 1940. The disclosures of the foregoing publications and patent are herein made a part of the present application to the same extent as though set forth in full therein.

What is claimed is:

1. A system for transmitting information on the shape of a signal from a transmitting to a receiving station, the transmitting station comprising means for sampling a signal wave periodically and storing on a condenser a potential proportional to the sample amplitude, an amplifier tube the input of which is connected across the storage condenser, means for bridging across the load circuit of said tube a plurality of conductances in parallel to reduce the effective output voltage, a pulse generator, means controlled to build up the said conductances step by step by the coordination of the signal amplitude with pulses from the pulse generator until the residual effective output falls to an arbitrary reference level whereby the total introduced conductance is proportional to the sample amplitude and means for transmitting a series of pulses informative of the step-by-step introduction or non-introduction of the successive conductances.

2. The combination of claim 1 characterized by the fact that the successive steps of conductance to be introduced or not introduced are in a decreasing order of magnitude, the steps being multiples of the smallest and final step to be used.

3. A system for transmitting information on the shape of a signal wave from a transmitter to a receiver station the transmitter station comprising a circuit for periodically sampling the amplitude of the wave, a current source adapted to deliver a current proportional to the sample amplitude and constant for the duration of a sampling interval, a circuit for transferring the effective voltage across the load to a polarity and amplitude detecting circuit, a plurality of $n$ conductances to be connected as shunts across the load circuit of said current generator and so reducing the voltage reaching the polarity and amplitude detector, a control circuit for each conductance, a pulse generator adapted to generate cycles of pulses one pulse in the cycle serving as a marker pulse and as timing the sampling of the signal wave, another serving as a polarity pulse to cooperate in testing the polarity of the sample amplitude, the remaining pulses operating successively through the control circuits of the conductances in cooperation with the residual amplitude reaching the amplitude detector to introduce one or more of the conductances and thus finally reduce the residual reaching the amplitude detector to an arbitrary small value, a circuit associated with each control circuit to transmit an "off" signal if its conductance is left in and an "on" signal if it is removed, the $n$ conductances being graded in size from the smallest of value $G_0$, the largest being first tested for introduction, the system so operating that the sum of the conductances introduced and left in at the end of the cycle is proportional to the sample amplitude.

4. A system for transmitting information on the shape of a signal wave from a transmitting to a receiving station, the transmitting station comprising a circuit for periodically sampling the amplitude of the wave and storing a charge on a condenser proportional to the amplitude, a constant current source controlled by the condenser charge and adapted to deliver a current proportional to the condenser charge and constant for the duration of a sampling interval the current being substantially independent of the load, a circuit for transferring the voltage across the load to a polarity and amplitude detecting circuit, a plurality of $n$ conductances to be connected as shunts across the load circuit of the constant current generator to reduce the voltage reaching the polarity and amplitude detector, a control circuit for each conductance, a pulse generator adapted to generate cycles of pulses each pulse consisting of $2+n$ equally spaced pulses the first pulse in the cycle serving as a marker pulse and as timing the sampling of the signal wave, the second serving as a polarity pulse for timing the operation of the detector to test the polarity of the condenser charge, the next pulse operating through the control circuit of the first and largest conductance with the signal amplitude reaching the amplifier detector to introduce the said first conductance $G_1$ as a shunt and to leave it in if the residual then reaching the amplifier detector is above an arbitrary small value and next to remove it if the residual is less than this small value, a circuit associated with the control circuit to transmit an "off" signal if the conductance is left in and an "on" signal if it is removed, the succeeding pulses in coordination with the residual then reaching the amplitude detector operating in turn in the same manner through the control circuit to introduce and then remove if necessary the various conductances and to transmit corresponding signals, the $n$ conductances being graded in size from the smallest of value $G_0$ to the largest of value $2^{n-1} G_0$ the sum of the conductances introduced and left in at the end of a cycle being proportional to the sample amplitude, the size of the steps increasing in accordance with a binary counting system.

5. A system for transmitting information on the shape of a signal wave from a transmitting to a receiving station the transmitting station comprising a circuit for periodically sampling the amplitude of the wave and storing a charge on a condenser said charge being proportional to the amplitude; a local oscillator of frequency higher than the sampling frequency, a modulator subject to the local oscillator and the condenser charge, a constant current source controlled by the modulator and adapted to deliver a current of oscillator frequency of amplitude proportional to the condenser charge and constant for the duration of a sampling interval the current being substantially independent of the load; a circuit for transferring the voltage across the load to a demodulator circuit and a polarity and amplitude detecting circuit; a plurality of $n$ conductances to be connected as shunts across the load circuit of the constant current generator and to reduce the voltage reaching the demodulator but being normally out of circuit, a separate control circuit for each conductance, a pulse generator adapted to generate cycles of pulses each cycle consisting of $2+n$ equally spaced pulses the first pulse in the cycle serving as a marker pulse and as timing the sampling of the signal wave, the second serving as a polarity pulse for timing the operation of the detector to test the polarity of the condenser charge the next pulse operating through the control circuit and largest conductance in cooperation with the signal amplitude reaching the amplitude detector to introduce the said first conductance $P_1$ as a shunt and to leave it in if the residual then reaching the amplitude detector is above an arbitrary small value and to remove it if the residual is less than this small value; a circuit associated with the control circuit to transmit an "off" signal if the conductance is left in and an "on" signal if it is removed, the succeeding pulses in cooperation with the residual then reaching the amplitude detector operating in turn in the same manner through the control circuits to introduce and then remove if necessary the various conductances and to transmit corresponding signals the $n$ conductances being graded in size from the smallest of value $G_0$ to the largest of value $2^{n-1} G_0$, the size of the successive conductances being $2^m G_0$ (for $m$ from 0 to $n-1$) the reduction in residual at any stage reaching the amplifier detector being proportional to the conductance introduced and the sum of the conductances left in being proportional to the sample amplitude.

6. A combination of claim 5 characterized by a receiver adapted to receive from each wave sample at the transmitter the cycle of code pulses characterizing its polarity and its amplitude the said receiver comprising a pulse generator triggered by the first or marker pulse in the cycle and giving rise to a cycle of pulses in synchronism with and corresponding to the cycle at the transmitter, a local oscillator, a plurality of $n$ conductances proportional respectively to the $n$ conductances at the transmitter and adapted to be introduced or not introduced, a control circuit for each conductance, all control circuits receiving simultaneously with the marker pulse a pulse to remove any or all $n$ conductances, means for supplying therethrough local oscillation current to the introduced conductances in parallel, means for supplying to each control circuit and to the polarity amplitude detector in parallel the received signal pulses, the received polarity signal cooperating with the local key pulse to determine the phase of local oscillatory current supplied to the conductance, the $n$ amplitude signal pulses cooperating in the respective control circuits with the corresponding $n$ local amplitude pulses to introduce conductance in parallel in the same combination as at the transmitter whereby a current of local oscillatory frequency flows through the parallel conductance proportional to the original sample amplitude, a homodyne detector circuit receiving said last-named current and local oscillatory current to give a detecting pulse proportional to the sample amplitude and means for assembling the successive reproduced samples to yield a reproduction of the original wave form.

7. A combination of claim 4 characterized by a receiver adapted to receive from each wave sample at the transmitter the cycle of code pulses characterizing its polarity and its amplitude the said receiver comprising a pulse generator triggered by the first or marker pulse in the cycle and giving rise to a cycle of pulses in synchronism with and corresponding to the cycle at the transmitter, a plurality of $n$ conductances proportional respectively to the $n$ conductances at the transmitter and adapted to be introduced or not introduced, a control circuit for each conductance, all control circuits receiving simultaneously with the marker pulse a pulse to remove any or all $n$ conductances, a polarity amplitude detecting circuit, means for supplying therethrough current to the introduced conductances in parallel for supplying to each control circuit and to the polarity amplitude detector in parallel the received signal pulses the received polarity signal cooperating in the local P pulse to determine the direction of current supplied to the conductances, the $n$ amplitude signal pulses cooperating in the respective control circuits with the corresponding $n$ local amplitude pulses to introduce conductance in parallel in the same combination as at the transmitter whereby a current flows through the parallel conductances proportional to the original sample amplitude and a pulse therefrom and means for assembling the successive reproduced sample pulses to yield a reproduction of the original wave form.

8. A communication system comprising means for periodically sampling the message wave to produce a current proportional to the amplitude of the message wave, a plurality of conductance elements adapted to be connected in shunt with each other to receive said current, a measuring circuit connected to be responsive to the voltage across said conductance elements, means for effectively connecting said conductance elements in circuit in succession, and means responsive to said measuring circuit for maintaining the last connected inductance element in circuit when the voltage to said measuring circuit exceeds a predetermined value and for effectively disconnecting said conductance element from the circuit when the voltage to said measuring circuit is below said predetermined value.

9. A communication system according to claim 8 in which said conductance elements are proportional to different fractions of the maximum amplitude capacity of the system.

10. A communication system according to claim 8 in which said conductance elements are proportional to different fractions of the maximum amplitude capacity of system, and said means for effectively connecting said conductance elements in circuit in succession connects them in the decreasing order of their conductances.

JOHN R. PIERCE.

REFERENCES CITED

The following references are of record in the file of this patent:

UNITED STATES PATENTS

| Number | Name | Date |
|---|---|---|
| 2,172,354 | Blumlein | Sept. 12, 1939 |
| 2,262,838 | Deloraine | Nov. 18, 1941 |
| 2,272,070 | Reeves | Feb. 3, 1942 |
| 2,402,059 | Craib | June 11, 1946 |